United States Patent [19]
Anderson et al.

[11] 3,816,639
[45] June 11, 1974

[54] HIGH VOLTAGE CABLE SPLICE WITH GRADED INSULATION AND METHOD OF MAKING SAME

[75] Inventors: Harry Christen Anderson, Stratford; Burton Thornley MacKenzie, Jr., Monroe, both of Conn.

[73] Assignee: General Electric Company, New York, N.Y.

[22] Filed: May 14, 1973

[21] Appl. No.: 359,986

[52] U.S. Cl............... 174/73 R, 29/628, 156/49, 174/84 R
[51] Int. Cl. ............... H02g 15/08, H02g 1/14
[58] Field of Search.... 174/21 R, 21 C, 22 R, 73 R, 174/73 SC, 84 R, 88 R, 88 C; 29/628, 630 F; 156/49

[56] References Cited
UNITED STATES PATENTS

| | | | |
|---|---|---|---|
| 2,174,377 | 9/1939 | Bowden et al. | 174/73 R X |
| 2,362,963 | 11/1944 | Lee | 156/49 X |
| 2,393,935 | 1/1946 | Scott | 174/84 R |
| 3,499,099 | 3/1970 | Nicholson | 174/73 R |
| 3,585,274 | 6/1971 | Tomaszewski et al. | 174/73 R |
| 3,612,746 | 10/1971 | Sankey | 174/73 R |

FOREIGN PATENTS OR APPLICATIONS

| | | | |
|---|---|---|---|
| 587,580 | 4/1947 | Great Britain | 174/84 R |

Primary Examiner—Laramie E. Askin
Attorney, Agent, or Firm—R. G. Simkins; P. L. Schlamp; S. A. Young

[57] ABSTRACT

An electrically insulated cable splice of reduced mass and increased service reliability for conductively connecting high voltage insulated electrical cable comprising a central current carrying conductor surrounded by electrically insulating material, and the method of forming same. The splice construction comprises a combination of materials of different specific inductive capacitances, the symmetrically counterposed relation of components to control electrical stresses, and physical restraints to inhibit movement of the materials comprising the splice.

16 Claims, 3 Drawing Figures

HIGH VOLTAGE CABLE SPLICE WITH GRADED INSULATION AND METHOD OF MAKING SAME

BACKGROUND OF THE INVENTION

This invention relates to splices or unions for conductively joining terminal ends of high voltage electrical cable having a central current carrying conductor surrounded by electrical insulating material. Splices for high voltage cables typically comprise bodies of large and bulky masses, and require many man hours to fabricate or assemble.

The grading of insulating materials enclosing electrical conductors, comprising the use of two or more insulating layers having different dielectric constants or specific inductive capacitances (SIC) arranged or graduated in a preferred order for the purpose of regulating and/or distributing electrical stresses, is known in the art. For example, note U.S. Pat. Nos. 1,802,030 and 3,433,891, and a technical paper entitled "Silicone Rubber Graded Constructions For High Voltage Insulations" by S. J. Nizinski, presented at the Tenth Annual Wire and Cable Symposium, Asbury Park, N.J., November 29 – Dec. 1, 1961.

SUMMARY OF THE INVENTION

This invention comprises an improved splice design and construction for joining terminal ends of high voltage insulated cable, for example the type of cable commonly utilized in transmitting systems in the order of 15KV, 35KV, 69KV and 138KV capacities, and wherein the cable comprises a central current carrying conductor surrounded by electrically insulating material. The design and construction of this invention provides for the attainment of the benefits of graded insulations within the section of the transmitting cable comprising the splice, and enables the forming of a splice with reduced man hours and mass, among other advantages and improvements.

The power cable splice in accordance with one embodiment of the invention includes the following in its construction: (1) At least two materials or components of different specific inductive capacitances (SIC) are provided in the splice with the material or component having the higher specific inductive capacitance positioned closer to the current carrying conductor. (2) The insulating material which surrounds the central current carrying conductor of each cable joined by the splice is tapered adjacent the cable's terminal extremity in a substantially uniform and gradual slope extending back from the central conductor to form a conical section. The tapered portion of the insulating material is enclosed within a body of the material or a component having the relatively higher specific inductive capacitance which extends over the insulating material in a symmetrical counter taper that diminishes in the opposite direction from the taper of the insulating material. (3) Restraining means are provided to inhibit movement or expansion of the material comprising the splice in either direction longitudinally along the axis of the joined cables.

The invention also includes a method of forming an improved splice according to the design and construction of the invention. The method in accordance with one embodiment of the invention comprises tapering the insulating material surrounding the current carrying conductor in the region adjacent to the terminal extremity of the cable end, and exposing a predetermined portion of the central conductor. The exposed conductor is attached to an adjoining conductor of another similarly tapered cable. A first material or component of a relatively high specific inductive capacitance is applied over the attached conductors and substantially over the tapered portions of the insulating material in a counter taper which slopes opposite to the taper of the insulating material. A second material or component of a lower specific inductive capacitance is applied over the aforesaid first material or component of higher specific inductive capacitance. Restraining means are introduced into the splice construction to inhibit longitudinal movement of the splice along the axis of the spliced cables.

OBJECTS OF THE INVENTION

It is a primary object of this invention to provide an improved insulated, electrical transmitting cable splice, and method of forming the same, which is more reliable and enduring in service, thereby rendering a longer, trouble-free performance life.

It is also an object of this invention to provide an improved splice design and construction for insulated high voltage transmitting cable of relatively smaller overall dimensions or mass, which distributes and reduces electrical stresses and maintains continuity in the radial stress field.

It is a further object of this invention to provide a novel insulated cable splice for high voltage service which provides increased resistance to voltage breakdown.

DETAILED DESCRIPTION OF THE INVENTION

Figure 1:
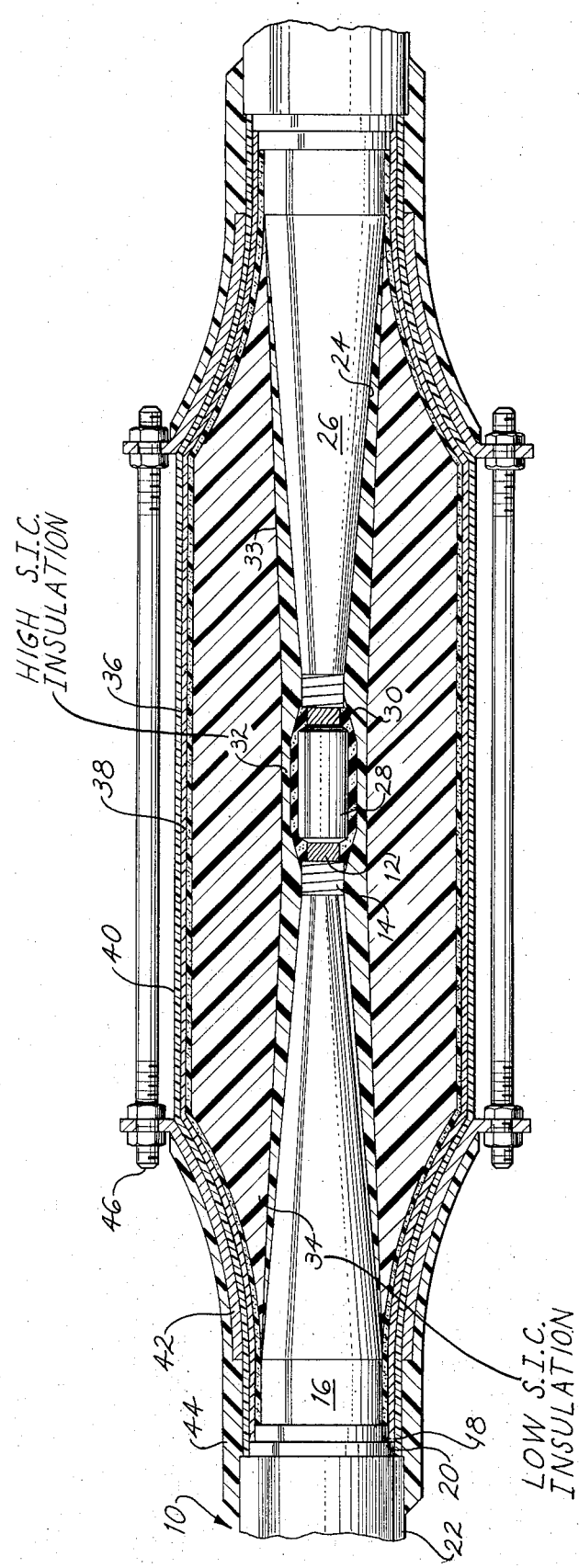
FIG. 1 is a view of a novel splice construction in accordance with one embodiment of this invention shown in cross-section, and with the terminal extremities of the cables joined therewith shown in elevation.

Referring to the drawings, the specific components and the structure of the high voltage cable shown in the drawings in connection with the illustrations of the cable splice design and construction of this invention are merely exemplary of a type of typical cable which can be effectively joined at its terminal ends by means of the novel splice of the invention. Accordingly the particular cable structure shown in the drawings is not to be considered a limitation of this invention or a part thereof other than expressly set forth hereinafter. Moreover, the splice design and construction of this invention is suitable to join substantially any type of electrical transmitting cable having a generally central current carrying conductor surrounded by electrical insulating materials, and it is uniquely applicable and advantageous in splicing cables of this construction carrying high voltages.

The illustrated cable 10 comprises a central current carrying metal conductor 12, which is shown as a bundle of wire strands although it may comprise a single conductor unit or strand. The conductor is covered with a layer of semi-conductive material 14 which is shown as tape, but can be applied by extrusion as a continuous covering unit. A relatively thick or large mass of electrical insulating material 16, such as polyethylene or ethylene-propylene rubber, surrounds the central current carrying conductor 12. Overlying the primary insulation 16 are a series of conventional components, comprising in sequene, an insulation shield of semi-conductive material 18, a shield of copper or aluminum tape 20, and a cable jacket or sheath 22 of polyvinyl chloride or similar durable polymeric material.

Pursuant to typical splicing techniques and conventional means of conductively connecting each terminal end of the current carrying conductor of the cables to be joined, a short predetermined portion of the end of the metal conductor 12 is exposed by removal of all surrounding components of the cable so as to enable the securing of a metal to metal contact of good electrical conductivity.

In accordance with this invention, the insulating material 16 in the area adjacent the cable's terminal extremity and the exposed end portion of the current carrying conductor 12, is provided with a substantially uniform and gradual taper 24 sloping back from the exposed central conductor, thus forming a conical section 26 generally as illustrated in the drawings.

The exposed ends of the central current carrying conductors 12 of the cables to be joined by the splice of this invention are conductively connected to each other by any suitable means, including conventional devices such as a compression type BURNDY connector of the Burndy Company which is illustrated as 28, or a weld type connection comprising a CADWELD of the Cadweld Company.

Preferably, and as illustrated, the conductor connecting means 28 and any exposed portions of the conductors adjacent thereto are enclosed with a layer of semi-conducting material 30 such as a wrapped tape, in order to maintain the continuity of the layer of semi-conductive material 14 about the conductor within the cable structure.

The splice of this invention comprises a first body 32 of material having a relatively high specific inductive capacitance of within the approximate range of 3 to 8, and preferably about 4 to 6, applied over and completely surrounding the conductor connection and extending therefrom back along the cable 10 over substantially the entire conical section 26 formed by the taper 24 of the insulating material 16. The relatively high SIC material of body 32 is deployed extending from the region of te connected conductors over the conical section 26 of the tapered insulating material 16 in a substantially uniform and gradual counter taper 33 which diminishes in the opposite direction from the taper 24 of the insulating material in a generally symmetrical counterposed relation.

Superimposed over and completely surrounding the body 32 of relatively high SIC material, is a generally relatively thicker unit or mass of a second body 34 of a material or materials having a lower specific inductive capacitance than that of the first body 32. In the preferred embodiment of this invention the lower specific inductive capacitance of the second body 34 is within the approximate range of 2 to 4.

To provide for the maintenance of the continuity or balance of the cable system, the section thereof comprising the splice is preferably provided with components generally corresponding in function to those of the original cable constructions. For example the splice for the cable described above is enclosed, in sequence, with a first layer of semi-conductive tape 36, a copper braid shield 38, and a covering layer 40 of a polymeric tape, to preserve the continuity of the corresponding cable components 18, 20 and 22.

In order to maintain stability of the electrical stress cones and thereby avoid failures due to the occurrence of discontinuities in the stress fields, it is necessary to restrict expansion due to changing thermal conditions or other causes, and any significant movement of the second body or other components of splicing materials in either direction longitudinally along the axis of the joined cable. Expansion of the materials of the cable splice can be relieved by providing for outward radial distension of the central mass of the splice without any damaging disruption of the balance or continuity of the stress cone or field.

Appropriate measures for providing dimensional stability comprises the application of a binding of a fibrous material of a high modulus such as glass fiber tape or cloth impregnated with an epoxy or other suitable cement and combined with reinforcing or restraining means. Tapes or cloth comprising glass strands are preferred because of the high tensile strength and very low modulus of elasticity of glass. Effective means for inhibiting adverse movement of the splice materials comprise a plurality of restraining devices, such as pairs of brackets 42 embedded within layers of a wrapping 44 composed of glass fiber tape or cloth impregnated with epoxy cement, held in a fixed spaced relation through the externally located adjustable tension rods 46. Rigid cone members can be utilized in place of the brackets and wrapping illustrated, or stays 48 such as illustrated in FIG. 2 can be employed to reinforce restraining wrappings to provide sufficient resistance to longitudinal movement.

In any case, because of the temperature fluctuations and extremes normally encountered in outdoor electrical systems, the restraining means should be designed to provide for central radial expansion of the materials of the splice to relieve any pressure on the ends. Central radial expansion of the splice components can be permitted by locating the transversing connections such as rods 46 for the end reinforcing brackets 42, or central portion of the stays 48, outside of and a distance beyond the exterior of the splice to enable the uninhibited outward distension of the central portion of the splice.

Figure 2:
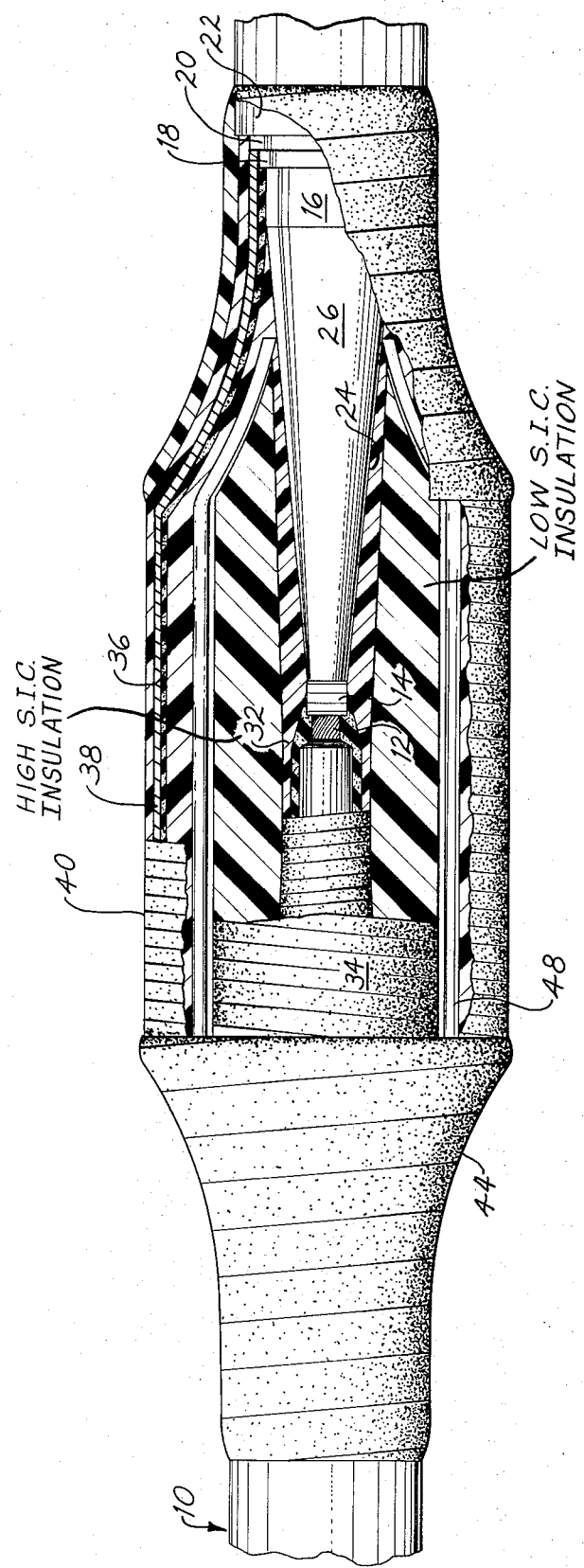
FIG. 2 is an elevational view of another embodiment of the splice of this invention and the joined cables, with a section fragmented and a portion thereof shown in cross-section; and, FIG. 3 is a view of still another embodiment of the splice of this invention shown in cross-section, and with the terminal extremities of the cables joined therewith shown in elevation.

FIG. 2 illustrates a splice of the design and construction of this invention which is primarily fabricated by convolutely winding or wrapping different tapes composed of materials of the prescribed characteristics around the connected central current carring conductor and the adjacent cable extremities in accordance with the arrangement and pattern of the invention. The illustration is partially fragmented with some internal portions shown in cross-section to illustrate a preferred form of construction.

The splice construction of this invention can be produced from a variety of materials and forms thereof. For instance substantially any composition or material possessing the required specific inductive capacitance will suffice for the first body 32 and/or the second body 34, especially those of organic polymeric or elastomeric compositions such as ethylene-propylene copolymers, ethylene-propylene terpolymers, polyethylene, butyl rubber, styrene-butadiene rubber, ethylene vinyl acetate, ethylene acrylate, natural rubber, and other high dielectric strength rubbery polymers and copolymers, and blends thereof. Moreover, the specific inductive capacitance of such materials can be changed and regulated through the introduction of appropriate amounts of fillers such as titanium dioxide, calcium titanate or barium titanate to achieve given values. Thus one can use a filled composition for the first body of relatively higher SIC, and the same composition with a reduced amount or without filler for the second body of relatively lower SIC.

Moreover, the splice construction can also be assembled or fabricated from various forms of these materials including tapes, shrinkable preformed units such as sleeves, or bodies which are molded in situ. The use of tapes to form and shape the bodies of high and low specific inductive capacitances is preferred because they provide greater versatility with respect to preparing splices of different dimensions and requirements for various sized cable and better insure the attainment of void free splice bodies. Preferably the tapes are self fusing or they may be curable and the layer thereof interbonded through the use of a cross-linking curing agent. Also the use of shrinkable tapes, due to heat or stretching, facilitates the achieving of a tight and substantially void free mass.

To illustrate the components of different specific inductive capacitance in a functioning splice of a 138KV cable system, the first body of material of relatively higher specific inductive capacitance, was fabricated with wrappings of a tape comprising ethylene-propylene rubber and containing approximately an equal part by weight of titanium dioxide. The composition of this tape in parts by weight was as follows:

| | |
|---|---|
| Ethylene propylene rubber (Vistalon 404, Enjay) | 100 |
| Titanium dioxide, rutile | 115 |
| Liquid 1,2-butadiene (Buton 150) | 3 |
| Antioxidant-polymerized trimethyldihydroquinol (Flectol-H, Monsanto) | 1 |
| Dicumyl peroxide curing agent (Di Cup T, Hercules Corp.) | 3.55 |

This tape had a specific inductive capacitance of about 4.4.

The second body of material of relatively low specific inductive capacitance was composed of a commercial ethylene-propylene rubber splicing tape, General Electric's IRRATHENE SPT, disclosed in U.S. Pat. No. 3,334,063, which is self-adhering and having a specific inductive capacitance of about 2.4.

It is also within the concept and scope of this invention to design and construct a high voltage splice with more than two materials or components of different specific inductive capacitances, such as for example three or possibly more materials or components, or simply a multiplicity of layers of different specific inductive capacitance provided that the material, component, layer, etc., having the highest specific inductive capacitance is located closer to the central current carrying conductor and that these units are therefrom arranged or graduated in a sequence of progressively reduced specific inductive capacitances. A plurality of different specific inductive capacitances can easily be achieved through the application of multiple layers of different polymeric materials of the required diminishing sequence of SIC properties, or simply by including differing amounts of filler in layers of polymeric material such as diminishing quantities of titanium dioxide in a polymer. For example, a first body or layer of polymeric material containing substantial proportions of titanium dioxide filler and having a specific inductive capacitance such as about 5, a second body or layer of the polymeric material containing a reduced amount of filler and having a specific inductive capacitance such as about 4, a third body or layer of the polymeric material containing a further reduced amount of filler and having a specific inductive capacitance such as about 3, and possibly a forth body or layer of the polymeric material without filler and having a specific inductive capacitance such as about 2.

Figure 3:
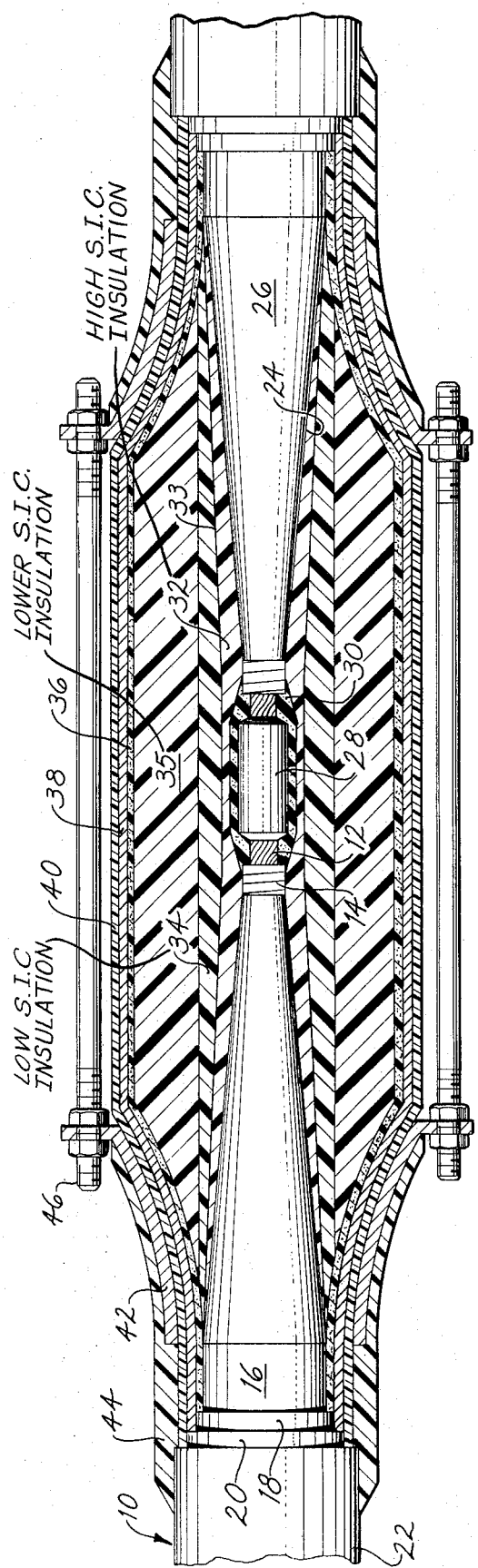

FIG. 3, illustrates an embodiment with multiple layers of graduated specific inductive capacitances, with the body 32 having the highest value, surrounding body 34 having a lower value, and in turn surrounding body 35 having the lowest value.

Although the invention has been described with reference to certain specific embodiments thereof, numerous modifications are possible and it is desired to cover all modifications falling within the spirit and scope of the invention.

What we claim as new and desire to secure by letters Patent of the United States is:

1. The method of forming an electrically insulated splice conductively joining terminal ends of high voltage electrical cable having a central current carrying conductor surrounded by electrically insulating material, comprising the steps of:

a. providing the insulating material which surrounds the central current carrying conductor of the cable joined by the splice with a substantially uniform and gradual taper adjacent to the terminal extremity of the cable thereby forming a conical section, and exposing a predetermined portion of the terminal end of the central conductor;

b. conductively connecting the exposed end of the central current carrying conductor to an adjoining current carrying conductor;

c. applying a first body of material having a relatively high specific inductive capacitance of within the approximate range of 3 to 8, around the connected central conductor and extending therefrom substantially over the tapered conical section of the insulating material in a substantially uniform and gradual counter taper which diminishes in the opposite direction from the taper of the insulating material;

d. applying a second body of material having a relatively low specific inductive capacitance of within the approximate range of 2 to 4, about the first body of material, said second body of material having a lower specific inductive capacitance than the first body; and, e. restricting expansion of material of the splice in either direction longitudinally along the axis of the cable joining splice.

2. The method of claim 1 wherein the material of the first body comprises titanium dioxide filler.

3. The method of forming an electrically insulated splice conductively joining terminal ends of high voltage electrical cable having a central current carrying conductor surrounded by electrically insulating material, comprising the steps of:
  a. providing the insulating material which surrounds the central current carrying conductor of the cable joined by the splice with a substantially uniform and gradual taper adjacent to the terminal extremity of the cable thereby forming a conical section, and exposing a predetermined portion of the terminal end of the central conductor;
  b. conductively connecting the exposed end of the central current carrying conductor to an adjoining current carrying conductor;
  c. forming a first body of material having a relatively high specific inductive capacitance of within the approximate range of 4 to 6, around the connected central conductor and extending therefrom substantially over the tapered conical section of the insulating material in a substantially uniform and gradual counter taper which diminishes in the opposite direction from the taper of the insulating material by wrapping tape of said material having a relatively high specific inductive capacitance about the connected central conductor and tapered insulating material;
  d. applying a second body of material having a relatively low specific inductive capacitance of within the approximate range of 2 to 4, about the first body of material by wrapping tape of the material around the first body, said second body of material having a lower specific inductive capacitance than the first body and being applied in a relatively greater thickness than said first body; and,
  e. restricting expansion of material of the splice in either direction longitudinally along the axis of the cable joining splice.

4. The method of claim 3, wherein the tape comprising the material of the first body contains titanium dioxide filler.

5. An electrically insulated splice conductively joining terminal ends of high voltage electrical cable having a central current carrying conductor surrounded by electrically insulating material, comprising:
  a. a pair of cable terminal extremities, each comprising a central current carrying conductor surrounded by insulating material, having the terminal ends of their central conductors conductively connected to each other and each having the insulating material which surrounds the central current carrying conductor adjacent the terminal extremity of each cable tapered in a substantially uniform and gradual slope extending back from the connected central conductors and forming a conical section;
  b. a first body of material having a relatively high specific inductive capacitance of within the approximate range of 3 to 8 surrounding the connected central conductors and extending therefrom substantially over the tapered portion of the insulating material of each cable with said material extending from the connected conductors substantially over the tapered portion of the insulating material in a substantially uniform and gradual counter taper which diminishes in the opposite direction from the tapered slope of the underlying insulating material;
  c. a second body of material having a relatively low specific inductive capacitance of within the approximate range of 2 to 4 superimposed over and surrounding the first body of material, said second body of material having a lower specific inductive capacitance than the first body; and,
  d. means restraining expansion of material of the splice in either direction longitudinally along the axis of the cable joining splice.

6. The electrically insulated splice of claim 5, wherein the material of the first body comprises titanium dioxide filler.

7. The electrically insulated splice of claim 5, wherein the material of the first and second bodies comprise at least one polymeric material selected from the group consisting of ethylene-propylene copolymer, ethylene-propylene terpolymer, polyethylene, butyl rubber, styrene-butadiene rubber, ethylene vinyl acetate, ethylene acrylate, natural rubber, and blends thereof.

8. The electrically insulated splice of claim 5 wherein the material of the first body comprises ethylene propylene rubber containing titanium dioxide filler and has a specific inductive capacitance of about 4.4.

9. The electrically insulated splice of claim 8 wherein the material of the second body comprises ethylene-propylene rubber and has a specific inductive capacitance of about 2.4.

10. An electrically insulated splice conductively joining terminal ends of high voltage electrical cable having a central current carrying conductor surrounded by electrically insulating material, comprising:
  a. a pair of cable terminal extremities, each comprising a central current carrying conductor surrounded by insulating material, having the terminal ends of their central conductors conductively connected to each other and each having the insulating material which surrounds the central current carrying conductor adjacent the terminal extremity of each cable tapered in a substantially uniform and gradual slope extending back from the connected central conductors and forming a conical section;
  b. a first body of material comprising tape having a relatively high specific inductive capacitance of within the approximate range of 4 to 6 convolutely wound about and surrounding the connected central conductors and extending therefrom substantially over the tapered portions of the insulating material in a substantially uniform and gradual counter taper which diminishes in the opposite direction from the tapered slope of the underlying insulating material;
  c. a second body of material comprising tape having a relatively low specific inductive capacitance of within the approximate range of 2 to 4 convolutely wound around and superimposed over the first body of tape material, said second body of tape material having a lower specific inductive capacitance than the first body of tape material and being of a thickness greater than the first body; and,
  d. means restraining expansion of the material of the splice in either direction longitudinally along the axis of the cable joining splice.

11. The electrically insulated splice of claim 10, wherein the tape material comprising the first body contains titanium dioxide filler.

12. The electrically insulated splice of claim 10, wherein the tape material of the first and second bodies comprises at least one polymeric material selected from the group consisting of ethylene-propylene copolymer, ethylene-propylene terpolymer, polyethylene, butyl rubber, styrene-butadiene rubber, ethylene vinyl acetate, ethylene acrylate, natural rubber, and blends thereof.

13. The electrically insulated splice of claim 10, wherein the tape material of the first body comprises ethylene-propylene rubber containing titanium dioxide filler.

14. The electrically insulated splice of claim 13 wherein the tape material of the second body comprises ethylene-propylene rubber.

15. The electrically insulated splice of claim 14 wherein the tape material of the first body has a specific inductive capacitance of about 4.4, and the tape material of the second body has a specific inductive capacitance of about 2.4.

16. An electrically insulated splice conductively joining terminal ends of high voltage cable having a central current carrying conductor surrounded by electrically insulating material, comprising:

a. a pair of cable terminal extremities, each comprising a central current carrying conductor surrounded by insulating material, having the terminal ends of their central conductors conductively connected to each other and having the insulating material which surrounds the central current carrying conductor adjacent the terminal extremity of each cable tapered in a substantially uniform and gradual slope extending back from the connected central conductors and forming a conical section;

b. a first body of material having a relatively high specific inductive capacitance of within the approximate range of 3 to 8 surrounding the connected central conductors and extending therefrom substantially over the tapered portion of the insulating material of each cable with said material extending from the connected conductors substantially over the tapered portion of the insulating material in a substantially uniform and gradual counter taper which diminishes in the opposite direction from the tapered slope of the underlying insulating material;

c. a second body comprising a plurality of materials having graduated specific inductive capacitance superimposed over and surrounding the first body of material, said second body of materials having specific inductive capacitance which are lower than the specific inductive capacitance of the first body of material and which are graduated in a sequence of specific inductive capacitances progressively diminishing from the higher specific inductive capacitance of the first body of material; and, d. means restraining expansion of material of the splice in either direction longitudinally along the axis of the cable joining splice.

* * * * *

PO-1050
(5/69)

UNITED STATES PATENT OFFICE
CERTIFICATE OF CORRECTION

Patent No. 3,816,639　　　　　　　　　Dated　　June 11, 1974

Inventor(s)　Harry C. Anderson & Burton T. MacKenzie

It is certified that error appears in the above-identified patent and that said Letters Patent are hereby corrected as shown below:

Claim 10, line 20,　　　after "tapered", "portions" should be - portion -

Signed and sealed this 3rd day of December 1974.

(SEAL)
Attest:

McCOY M. GIBSON JR.　　　　　　　C. MARSHALL DANN
Attesting Officer　　　　　　　　Commissioner of Patents